FRANCES P. AVERY (NOW BY MARRIAGE FRANCES P. AVERY SEYMOUR).
SNAFFLE HOOK.
APPLICATION FILED JULY 22, 1908. RENEWED DEC. 31, 1909.
967,486. Patented Aug. 16, 1910.
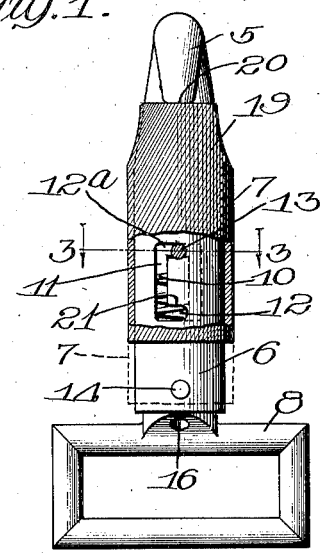
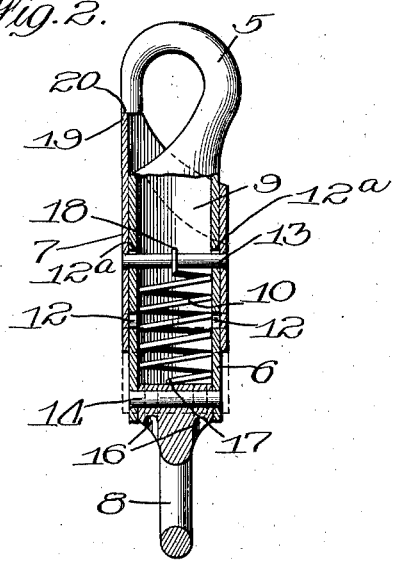
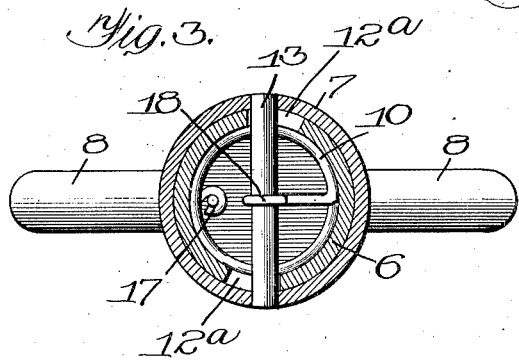
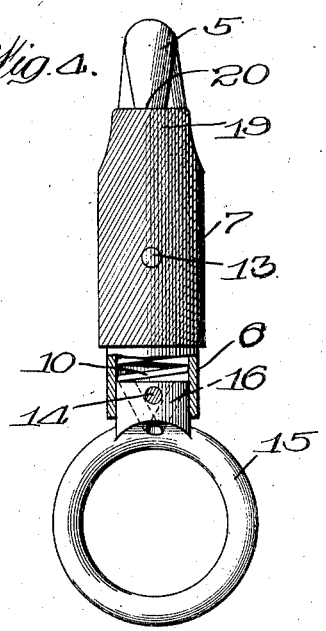

UNITED STATES PATENT OFFICE.

FRANCES P. AVERY, (NOW BY MARRIAGE FRANCES P. AVERY SEYMOUR,) OF MOLINE, ILLINOIS, ASSIGNOR TO AVERY MANUFACTURING COMPANY, OF DETROIT, MICHIGAN, A CORPORATION.

SNAFFLE-HOOK.

967,486.  Specification of Letters Patent.  Patented Aug. 16, 1910.

Application filed July 22, 1908, Serial No. 444,705. Renewed December 31, 1909. Serial No. 535,901.

*To all whom it may concern:*

Be it known that I, FRANCES P. AVERY, a citizen of the United States of America, and resident of Moline, Rock Island county, Illinois, have invented a certain new and useful Improvement in Snaffle-Hooks, of which the following is a specification.

My invention relates to improvements in snaffle hooks, and has for its object the production of a device by means of which the hook is positively locked in either open or closed position.

A further object is the production of a device that is of simple construction and of few parts, and one that is least liable to get out of order.

A further object is the production of a device that can be cheaply constructed and one that is positive in its results.

These and such other objects as may hereinafter appear are attained by my device, embodiments of which are illustrated in the accompanying drawings, in which—

Figure 1 represents a side elevation of my device with a portion of the guard broken away. Fig. 2 represents a side view of Fig. 1, partly in section. Fig. 3 represents a sectional view on line 3—3 of Fig. 1, looking in the direction indicated by arrows. Fig. 4 represents a view similar to Fig. 1, with a portion of the chamber broken away.

Like numerals of reference indicate like parts in the several figures of the drawing.

Referring now to the drawing, the device comprises a hook portion 5, a shank 6, a sliding guard 7, and a rectangular eye 8. The shank 6 is hollow and within the chamber 9 is seated a spring 10. A slot 11 passes through the shank longitudinally thereof, terminating in pockets 12—12ª extending at right angles thereto and at either end of the slot 11. A movable pin 13 passes through the spring guard 7 and through the shank 6, and is adapted to move within the slot 11 and pockets 12 and 12ª. The slot and pockets are duplicated on the opposite side of the shank, as clearly shown in Fig. 3. The rectangular eye 8 is either formed integral with the shank or secured thereto by means of a bolt 14, as shown in Fig. 1.

In Fig. 4, the circular eye 15 is substituted for the rectangular eye 8. Passages 16 extend from the bottom of the chamber 9, communicating with the air in order to permit any water that may accumulate within the hook to drain out. The spring 10 is supported at the bottom at 17, and is turned upwardly at the top at 18 and forced to abut against the pin 13, so as to normally force the pin into the pocket 13 when the pin is resting in the upper portion of the slot 11. The guard 7 is preferably formed to entirely surround the shank, and is formed with an upwardly extending portion or apron 19 adapted to practically abut or engage the end 20 of the hook 5.

In the operation of my device, the device as shown in Fig. 1 is in locked position. The guard 7 is turned to the left against the torsion of the spring 10; that is to say, if the guard were released when the pin reaches the edge of the slot 11, the spring will immediately force the pin back into locked position, as shown. The guard is then slipped downwardly, the pins traveling in the slot 11 until it reaches the bottom. The guard is then turned back to the right, forcing the pin within the pocket 12, in which position the shoulder 21 holds it in position. When it is desired to close the hook, it is simply necessary to turn the guard to the right until the pin engages the side of the slot 11. The guard is then released and the spring 10 having been compressed in the first operation, throws the pin 13 upwardly in the slot 11 and back into locked position, as shown in Fig. 1.

This device is of very simple construction, but performs its office in a positive manner. By its use, it is impossible for any animal secured by its means to throw the hook into open position, it being necessary, in addition to turning the guard to the right, to hold it there until the guard has been forced down and even then to turn it into the pocket 12 before the pressure of the spring is thrown off the guard.

I claim:

As a new article of manufacture, a snaffle hook comprising a chambered shank, a hook member on the end of said shank, a hollow cylindrical guard surrounding said shank and mounted for sliding movement only, a single ear covering the point of said hook when in closed position, a spring seated within said shank, a spring stop passing through the walls of said shank and engaging said guard, and a channel in the walls of said shank within which said stop passes provided with pockets at either end within which said stop fits, locking said guard in open or closed position, said shank being provided with passages for draining any liquid from the interior thereof, said passages being located in the end of said shank opposite the hook.

Signed by me at Chicago, Illinois, this 6th day of July, 1908.

FRANCES P. AVERY.

Witnesses:
ALBERT J. SAUSED,
ELLEN H. CLEGG.